June 23, 1970     G. W. CLARK III     3,516,546
CHROMATOGRAPHY APPARATUS
Filed April 2, 1969
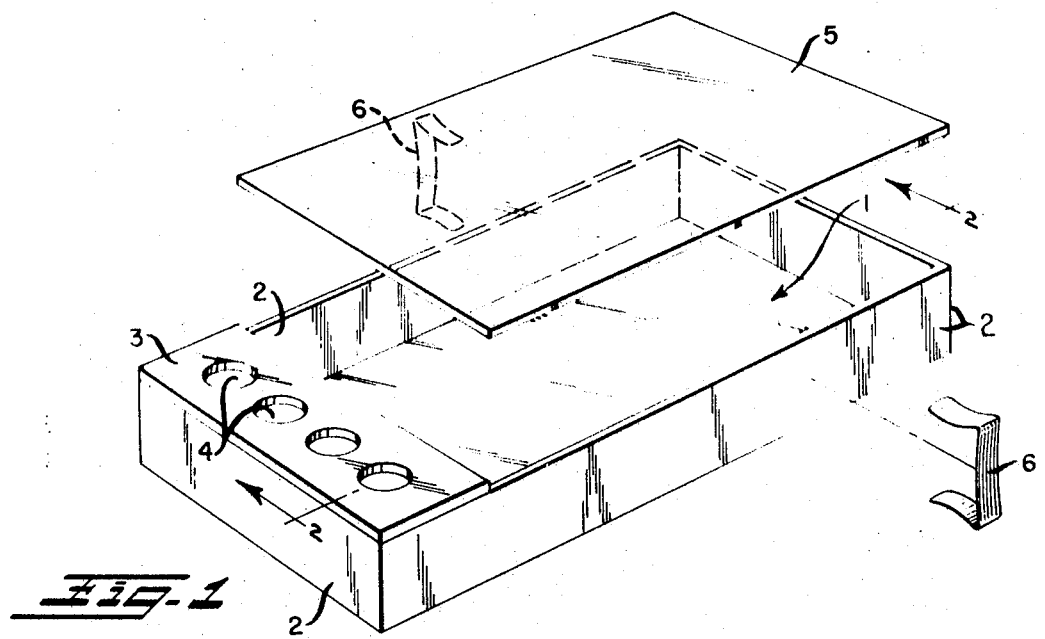
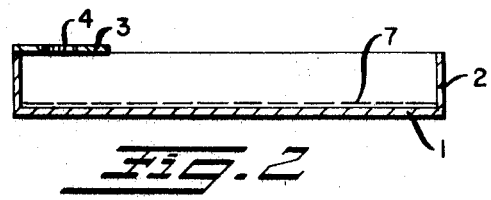
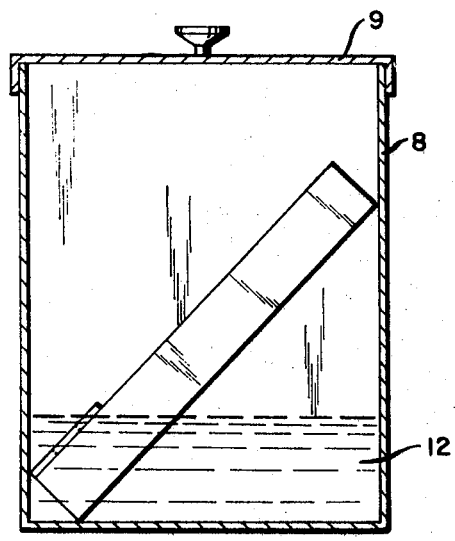
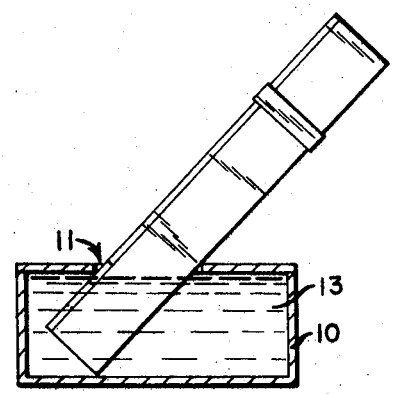
INVENTOR.
GEORGE W. CLARK III

United States Patent Office 3,516,546
Patented June 23, 1970

3,516,546
CHROMATOGRAPHY APPARATUS
George W. Clark III, 1515 Ashland Ave.,
Columbus, Ohio 43212
Filed Apr. 2, 1969, Ser. No. 812,690
Int. Cl. B01d *15/08*
U.S. Cl. 210—198                          9 Claims

ABSTRACT OF THE DISCLOSURE

A thin-layer, thick-layer preparative chromatographic element support device (including a rear wall and side walls contiguous to a chromatography medium coated on the rear wall, and having a perforated partial front wall) provides increased dimensional stability of the medium and promotes uniform solvent evaporation across the width of the chromatography medium during development of a chromatogram. This support device can be advantageously integrated into a wide variety of preparative chromatography apparatus systems.

---

This invention relates to preparative chromatography and more particularly to an improved support means for maintaining the dimensional integrity of a preparative chromatography medium.

The art of chromatography is an established technique in biological and chemical laboratories for the analysis and preparation of chemical compounds. It operates on a principle somewhat similar to wicking action wherein a liquid solvent rises in an adsorbent sheet or layer with various substances placed thereon rising differing amounts therewith to provide a "pattern" or chromatogram which can be visually analyzed. Preparative chromatography refers to those chromatographic techniques whereby a recoverable amount of a chemical compound or compounds is obtained from the chromatogram. This is to be distinguished from analytical chromatography wherein only chemically identifiable trace amounts are sought.

Typically, separations are accomplished by placing mixtures of materials to be recovered on the lower portion of an adsorbent chromatography medium layer and thereafter mounting the medium (usually on a supporting means) at an angle in an eluant solvent with the lowermost portion of the adsorbent layer dipped in the solvent. The eluant solvent wets the adsorbent layer by advancing upward from the dipped edge toward the opposite, uppermost edge. As the solvent advances, it acts as a vehicle for the constituents of the mixture being separated. The apparatus typically includes a solvent reservoir and a means of supporting the adsorbent chromatography medium for the passage or migration of eluent solvent.

Preparative chromatographic elements utilize adsorbent layers of substantially greater thicknesses than do those elements designed for analytical chromatography. In preparative chromatography, where the adsorbent chromatography medium layer ranges up to about 1 mm. in thickness, the technique is designated thin-layer preparative chromatography. Where layers in excess of 1 mm. are employed, the conventional designation is thick-layer chromatography. As will become increasingly apparent, it is essential that the chromatography medium be properly supported.

Typical chromatography media include an adsorbent material such as, for example, silicon dioxide (silica gel), aluminum oxide, magnesium silicate, etc., and they can additionally contain a binder material, e.g., calcium sulfate, starch, polyvinyl alcohol, carboxymethyl cellulose and the like, to promote increased adherence within the adsorbent layer and between it and the support device. Adequate adhesion of the adsorbent layer to the support is a significant problem in preparative chromatography, since layers of the required thickness adsorb, on a weight basis, large quantities of solvent which both increases the weight of the chromatography medium and at the same time decreases the mutual adhesion of support and adsorbent medium due to solvent action. These two factors cooperate to promote sagging of the adsorbent layer downward along the typically inclined support means or even, in extreme cases, actual separation of the layer from its support, whereupon it can slide to the lowermost portion of the support—thereby frustrating any attempt at obtaining the desired chromatogram.

An obvious corrective measure is to decrease the angle of inclination at which the chromatographic element is maintained, but as the angle is decreased, resolution of the resultant chromatogram is undesirably diminished. An alternative solution is to provide a more adherent binder material to increase adhesion between chromatography medium and support material. Many binders of increased adherence, however, tend to introduce impurities into the system, thereby impairing the production of a desirable chromatogram. Additionally, solvent resistant binder materials tend to decrease the solvent affinity of the adsorbent medium which inhibits the formation of a well-defined separation pattern.

Also pertinent to thin-layer and thick-layer preparative chromatography is the problem of "edging," the increased evaporation of eluant solvent at the edge portions of the chromatography medium which edging tendency causes substantial variations in solvent advance and consequent deleterious non-uniformities in the chromatographic separation.

A related difficulty is erosion of that portion of the adsorbent layer which is maintained below the surface of the solvent. Any agitation of the solvent heightens this occurrance, and thereby impairing the full and uninterrupted elution of solvent throughout the adsorbent layer, with a consequent deleterious affect on the separation pattern.

Typically employed support devices generally involve flat plates which are readily coatable with an adsorbent medium such as those described elsewhere herein. Often, these supports are formed from a fragile material such as glass. Their planar configuration provides but minimum restraints against the above-mentioned tendencies toward dimensional breakdown. Additionally, the problem of "edging" is not diminished by a flat plate support means, nor is that of erosion of the adsorbent layer.

Therefore, it is an object of this invention to provide a support device for preparative chromatography which promotes the dimensional integrity of the adsorbent medium during exposure to solvent vapors.

Another object of the present invention is to provide a support device for preparative chromatography which inhibits the occurrence of edging from the adsorbent medium during exposure to solvent vapors.

Still another object of the instant invention is to provide a robust support device for preparative chromatography.

Yet an additional object of this invention is to provide a support device for preparative chromatography which restrains solvent erosion of the adsorbent medium.

In accordance with the present invention there is provided a prepaartive chromatographic element support device having a rear wall, side walls and a partial front wall having perforations therein. The rear wall provides a substantially planar surface onto which can be coated an adsorbent chromatography medium. Side walls cooperating with the rear wall exert, in effect, a retaining force against the adsorbent medium and tend to enhance the preservation of its "as coated" dimensional integrity.

In this fashion, additional adherence as well as a physical enclosure are added to the restraints on dimensional degradation of the coated adsorbent provided by the heretofore available support plates. In use, the support device is typically mounted in a diagonal fashion (at an angle) with its lowermost portion immersed in an eluant solvent. The major portion of the front wall, and including the perforations therein, is intended to be maintained below the solvent level. The perforations permit access of the eluant solvent to the adsorbent medium, but the barrier action provided by the solid front wall portions tends to stabilize the liquid solvent against the formation of currents or surface agitation if the solvent is disturbed in any fashion. The result is decreased erosion from solvent turbulence. As solvent tends to migrate upward through the chromatography medium, the side walls likewise function to seal the edges of the adsorbent layer against undesired solvent evaporation, thereby minimizing the undesirable cross-sectional non-uniformity in a chromatogram which is promoted by an edging condition. The support device set forth herein can be employed in cooperation with numerous solvent reservoirs to constitute a complete chromatographic apparatus system. Where only the lowermost portion of the support device is maintained within a solvent reservoir, a cover plate means is advantageously utilized in cooperation with the remainder of the support device to form a sealed system which maintains solvent vapors therein and prevents their escape into the surrounding atmosphere. Alternatively, the entire support device can be diagonally maintained within a surrounding solvent reservoir.

The above and other features and objects of the present invention will be increasingly apparent having reference to the following specification taken in conjunction with the accompanying drawing in which:

FIG. 1 is a exploded perspective view of the novel support device, its optional cover plate and a pair of cover retaining clips;

FIG. 2 is a sectional view of the support device taken along line of 2—2 of FIG. 1 looking in the direction of the arrows;

FIG. 3 is an elevational view, partly in section of one type of reservoir with which the novel support device can be utilized; and FIG. 4 is an elevational view, partly in section, of another type of solvent reservoir with which the novel support device can be utilized.

Referring now to the drawing, wherein like numbers indicate similar parts, the preparative chromatographic support tray illustrated in FIG. 1 includes a rear wall 1 on which is carried four side walls 2 of which the opposing walls are identical. The four side walls 2 are illustrated in a perpendicular relationship with each other and with the rear wall 1. They can also be desirably oriented in an inwardly inclined fashion, forming an acute angle with the rear wall. Over the smaller of one of the side walls 2 is carried a front wall 3 having perforations 4 therein, which front wall 3 extends along the two opposing walls adjoining the smaller side wall to cover a small portion of the rear wall, with the exception of the area beneath the multiple perforations 4. The wall portions can be advantageously fabricated from any material which is inert with respect to and not dissolved in solvents which are susceptible of use in chromatography. Especially desirable are robust materials such as metals like stainless steel, inert plastics such as poly-α-olefins like polyethylene and polypropylene, as well as other materials exhibiting both chemical inertness and resistance to deformation or breakage. A cover plate 5 is mounted on the support device to cooperate in a sealing relationship with both the partial front wall 3 and the remaining side walls not covered by the partial front wall 3. A gasket can be positioned on the sealing edges, but it is not usually required. The cover plate 5 is maintained in this sealing relationship by spring clips 6. Alternative fastening means can also be used. The use of a cover plate 5 is optional in many instances unless the composite apparatus (typically including a solvent reservoir and support device) is such that solvent vapors would escape from the interior of the support device into the surrounding atmosphere.

As shown in FIG. 2, an adsorbent layer 7 (indicated in phantom, FIG. 2) is carried on the rear wall 1 with the edges of the adsorbent layer 7 butting against side walls 2. Although the side walls 2 are illustrated as being substantially greater in height than is adsorbent layer 7, in practice they are desirably only slightly higher (e.g. 0.5 cm. for an adsorbent layer thickness of 3 mm.).

As shown in FIG. 3, the support device as shown in FIG. 1, but without either a cover plate 5 or retaining clips 6, is diagonally supported within a tank-type solvent reservoir 8 which is topped by a cover 9. Solvent 12 is carried in the bottom of the reservoir 8, such that the solvent level is at a point on the support device front wall (3 as shown in FIG. 1) which is above the perforations (4 as shown in FIG. 1).

Referring now to FIG. 4, the support device as shown in FIG. 1 is represented in combination with a second type of solvent reservoir 10 having a slot or opening 11 in a top wall into which the support device is diagonally inserted in a sealing relationship with the edges thereof. The solvent 13 is maintained at a point on the lowermost portion of the support device similar to that illustrated with reference to FIG. 3. Solvent 13 and solvent vapors have free access to the interior of the support device via the perforations (4 shown in FIG. 1) contained in the front wall (3 as shown in FIG. 1.)

While a particular embodiment of this invention is shown, modifications thereof will occur to those skilled in this art. The invention has been described in detail with particular reference to certain preferred embodiments thereof, but it will be understood that variations and modifications can be effected within the spirit and scope of the invention.

I claim:

1. A thin-layer, thick-layer preparative chromatographic element support device comprising a rear wall, side walls merging with each other and with said rear wall and a partial front wall having perforations therein, which partial front wall is positioned on and merges with said side walls to substantially cover a portion of said rear wall beginning at one edge and extending along an entire width thereof, thereby forming a support device the component parts of which cooperate to promote, during development the dimensional integrity of a preparative chromatography medium coated on said rear wall.

2. A preparative chromatographic support device as set forth in claim 1, wherein said side walls merge with each other and with said rear wall and said partial front wall in a substantially perpendicular relationship.

3. A preparative chromatographic support device as set forth in claim 1, wherein said partial front wall substantially covers a minor portion of said rear wall.

4. A preparative chromatography support device as set forth in claim 1, wherein said perforations are arranged in said partial front wall along an axis line substantially equivalent to an entire width of said rear wall and equidistantly spaced from the edges of said partial front wall which parallel said axis line.

5. A preparative chromatography support device as set forth in claim 1, and including a cover plate means demountably mounted in an intimate sealing relationship with said partial front wall and with said side walls not merging with said front wall, thereby substantially enclosing and sealing the interior volume of said support device.

6. A preparative chromatography support device as set forth in claim 1, wherein said walls are comprised of a chemically inert, solvent resistant material.

7. A preparative chromatographic support device as set forth in claim 1, wherein said walls are comprised of stainless steel.

8. In preparative chromatographic apparatus comprising a solvent reservoir, a removable cover means and a preparative chromatography support means diagonally supported within said solvent reservoir, the improvement which comprises having as the support means a chromatography support device as set forth in claim 1.

9. In preparative chromatography apparatus comprising a substantially enclosed solvent reservoir having in an upper wall thereof an opening of predetermined dimensions into which is downwardly, diagonally inserted, in a substantially sealing relationship with the edges of said opening, the lowermost portion of a substantially enclosed preparative chromatographic support means whose interior volume opens into said reservoir to receive solvent vapors therefrom, the improvement which comprises having as said chromatographic support means a preparative chromatographic support device as set forth in claim 5 wherein the perforations in said partial front wall are within the lowermost portion of said support means.

References Cited

UNITED STATES PATENTS 3,327,857   6/1967   Kopp _____ 210—198

JAMES L. DECESARE, Primary Examiner